United States Patent [19]

Lederman

[11] Patent Number: 4,821,856
[45] Date of Patent: Apr. 18, 1989

[54] OVERRUNNING ROLLER CLUTCH WITH ROLLER CONTROL CARS

[75] Inventor: Frederick E. Lederman, Sandusky, Ohio

[73] Assignee: General Motors Corporation, Detroit, Mich.

[21] Appl. No.: 121,079

[22] Filed: Nov. 16, 1987

[51] Int. Cl.[4] .............................................. F16D 41/06
[52] U.S. Cl. .......................................... 192/45; 384/572
[58] Field of Search ................ 192/45, 44; 188/82.84; 384/559, 560, 572, 576, 578, 579

[56] References Cited

U.S. PATENT DOCUMENTS

| 2,044,197 | 6/1936 | Barthel | 192/45 |
| 3,917,036 | 11/1975 | Johnson et al. | 192/45 |
| 3,942,616 | 3/1976 | Elmore | 192/45 |
| 4,054,192 | 10/1977 | Johnson | 192/45 |
| 4,185,724 | 1/1980 | Kitchin | 192/45 |
| 4,522,289 | 6/1985 | Giese et al. | 192/41 A |
| 4,549,638 | 10/1985 | Johnston | 192/45 |
| 4,712,661 | 12/1987 | Lederman et al. | 192/45 |
| 4,724,940 | 2/1988 | Lederman | 192/45 |

FOREIGN PATENT DOCUMENTS 1296976 11/1972 United Kingdom ................ 384/576

Primary Examiner—Rodney H. Bonck
Assistant Examiner—Richard M. Lorence
Attorney, Agent, or Firm—Patrick M. Griffin

[57] ABSTRACT

A roller clutch in which the rollers are retained in tightly fitting cars that latch to the cage to give a highly secure shipping retention, but which unlatch at outer race ring in to free the cars and rollers, At overrun, the friction of the rollers within the tightly fitting cars reduces roller spin and consequent cam wear.

4 Claims, 5 Drawing Sheets

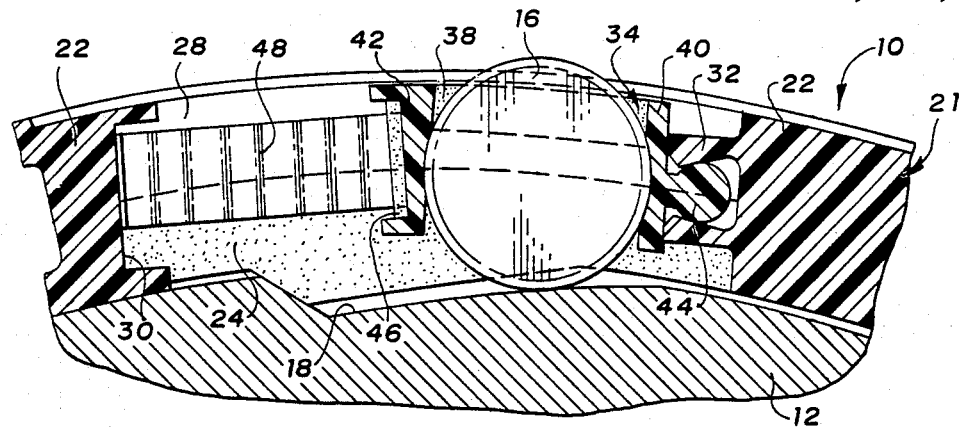
Fig. 3
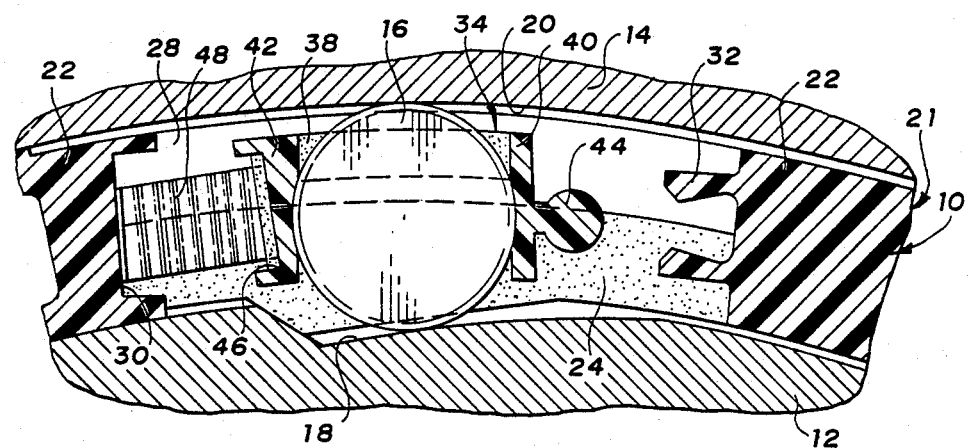
Fig. 4
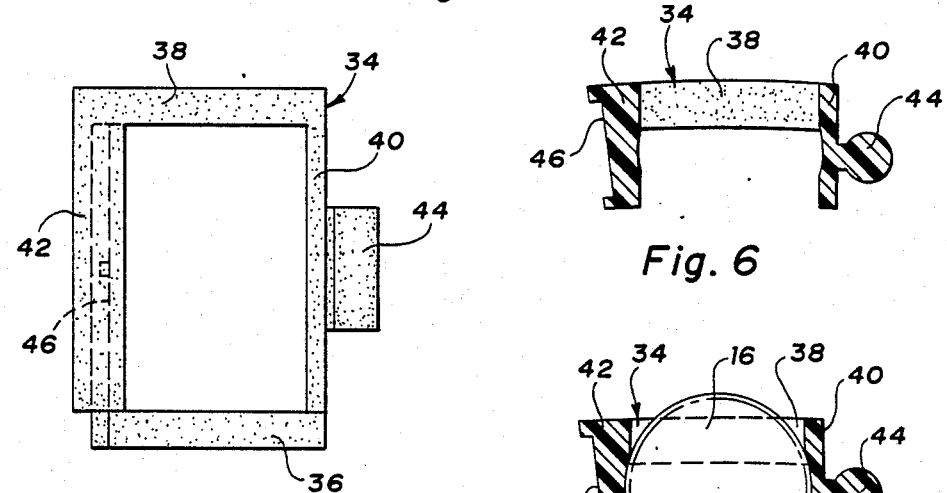
Fig. 5
Fig. 6
Fig. 7

OVERRUNNING ROLLER CLUTCH WITH ROLLER CONTROL CARS

This application relates to overrunning clutches in general, and specifically to a roller clutch that uses individual roller cars for each roller, both to retain the rollers to the clutch and to control and improve the performance of the rollers during clutch operation.

BACKGROUND OF THE INVENTION

As is well known to those skilled in the art, the two most common types of overrunning or one way clutches in use in high speed applications, such as in the gear sets of automatic transmissions, are sprag clutches and roller clutches. While roller clutches have a significant cost advantage, sprag clutches are currently used in many very high speed applications, because sprag elements are, in general, less subject to control problems at very high speeds than are rollers. However, an improved roller clutch that matched or even exceeded the high speed performance of a sprag clutch would be very desirable, because of cost considerations. Another common problem with roller clutches is that the rollers are generally not retained to the cage very strongly for shipping and handling purposes, and can be easily dislodged. Both the roller control problem and roller retention problem will be described in detail, as well as prior art proposals to deal with the problems.

The typical roller clutch has a plurality of cylindrical rollers that are located, after clutch installation, in wedging pockets formed between a cylindrical pathway on one clutch race and a series of sloped cam ramps on the other clutch race, usually called the cam race. A cage fitted to one race usually has side rails of some type to axially confine the ends of the rollers and prevent them from moving axially out of the annular space between the races. Individual energizing springs continually urge each roller up the cam ramp to a ready position. Because of eccentricities between the races and other forces, the rollers will and must move significantly, in the circumferential sense, back and forth within the wedging pockets during clutch operation, and will not all be in the same position at the same time. In fact, a great advantage of the roller clutch, compared to the sprag clutch, is that since the rollers can freely seek their own individual positions, the clutch races need not be maintained rigidly coaxial by outside bearings, as with sprag clutches. This circumferential movement of the rollers is generally referred to as roller travel, and anything in the clutch that would interfere with it would be highly undesirable. In a typical roller clutch, the only structure directly touching the roller to control its position, other than the race surfaces themselves, are the inside surfaces of the side rails, which face the axial ends of the rollers, and the energizing spring. The degree of interference with roller travel caused by the direct bumping and sliding contact of the roller ends with the inside surfaces of the cages side rails is limited. Likewise, the spring is not greatly limited in its travel by its energizing spring, which touches the roller only along one side of the roller, and which does, and must, compress and expand freely. Ideally, the energizing spring is only as strong as is necessary to provide the constant ready position bias. This is so that the roller will not be pushed any more strongly than necessary into the race surfaces. If the roller is pushed too strongly into the race surfaces, the traction of the pathway, during overrun, can spin the rollers against the cams, especially at high speeds, causing cam wear. This is especially a problem in inner cam clutches at high speeds, because the effects of centrifugal force throwing the rollers up the cams and into the pathway during overrun, as well as spring force, add to roller traction and spin wear.

While there is no significant limitation on circumferential roller travel by the cage or spring in a conventional roller clutch, neither is there any particularly effective control of the roller's operation during overrun. The need for free roller travel makes control and retention of the wedging elements much more difficult than it is in sprag clutches. Roller control is desirable, especially at high speeds. Lack of control of the roller spin has already been mentioned. Likewise, roller skew can occur when various external forces overcome the relatively weak energizing spring during overrun and send the roller out of ready position into the wide end of the wedging pocket. Once the roller is out of contact between the pathway and cam ramp, which provide the only real effective control over its orientation, it can skew out of parallel with the race coaxis.

The clutch designer must not only consider the rollers during clutch operation, but also their retention prior to installation, generally called shipping retention. If it were common to ship a roller clutch already installed between its races, then retention of the rollers to the cage would not be a problem. However, roller clutches are generally shipped alone, to be installed between the races later. The roller shipping retention system most often used is simple, but is very limited in the strength with which it can retain the rollers to the cage. Conventionally, during shipping, the only control of the rollers is from the resilience of the springs, which, in an expanded state, press the rollers against V grooves on the cage. The rollers are thus not only retained to the cage per se, but are also maintained in a definite shipping position, circumferentially spaced in a position where they will each slide onto a respective cam ramp when the clutch is installed. A great shortcoming of the system, despite its simplicity and low cost, is that the strength with which the rollers are retained is only as great as the resilience of the springs, that is, how hard the springs press the rollers into the v grooves. And, the springs, as noted above, are not particularly strong, nor should they be.

Few patents speak to the problem of roller control during clutch overrun. One patent that considers the roller spin and wear problem is U.S. Pat. No. 2,044,197 to Barthel. It discloses an inner cam clutch in FIG. 1, where the energizing springs act indirectly on the rollers through intermediate, asymmetrical weights pivoted to the cam race. The heavier side of the weights is located between the pivot and the rollers, so that, when the inner race rotates at high speed during overrun, centrifugal force pivots the weights away from the rollers, counteracting the springs. While this would lessen or remove the contribution to roller spin that the springs make, it would do nothing to counteract the pathway-roller traction that results just from the centrifugal force that throws the rollers up the cam ramps and into the pathway. Furthermore, in an application where there was no centrifugal force on the roller, that is, in the case where the cam race was static and the outer race turned, the weights would fail to pivot at all, and would therefore do nothing to relieve the spring force. In addition, the design would necessitate drastic changes in the size, operation, travel distance and cost of the energizing springs that are conventionally used, and would, therefore, be totally impractical in the context of a typical automatic transmission gear set. Nor does the design appear to do anything to better confine the roller to control or limit its potential skew, as the roller is still contacted on one side only.

As to control of the rollers during shipping and handling, some roller retention systems have been proposed in which the roller retention, while not totally independent of the spring, is at least independent of the resilience of the spring, and thus more secure. One such roller clutch is disclosed in U.S. Pat. No. 3,994,377 to Elmore. There, the energizing springs consist of axially opposed pairs of tabs lanced out from the metal cage side ails, which extend into hollowed out ends of the rollers, and which push or pull on the rollers to energize them. Roller retention would be quite secure, because the spring tabs are short and stiff. However, the clutch would be totally unworkable in many applications. The spring tabs, by their very nature, could only be used with metal cages, whereas plastic cages are often preferred. Steel suitable for cages would make very good or tough springs, and the short tabs would not be able to flex over a very long distance. Besides the inevitable weakening of the rollers from hollowing out their ends, there would be a great limitation in the roller travel possible. The rollers would inherently be able to travel less than their own diameter. Roller travel must often be greater than that during clutch overrun, due to eccentricity between the races and external forces acting on the roller. To be truly practical, the shipping retention scheme should place no limitations on cage material, and should use absolutely conventional rollers and springs, and present no limitations on the operation of either. A clutch that comes very close to that ideal is disclosed in the U.S. patent application Ser. No. 895,143, allowed Mar. 25, 1987, issued Feb. 16, 1988 as U.S. Pat. No. 4,724,940, assigned to the assignee of the current invention. There, shipping retention of the rollers, and of the springs, results from tabs on the sides of the endmost loops of the springs, which are trapped between the rollers on one side and ramps molded to the plastic cage side rails on the other side. This, in turn, holds the rollers against cage stop surfaces, and the net result is that springs, rollers and cage are all cooperatively held together before shipping, strongly and in a proper position for installation. Although the springs are necessary to roller retention, there is no reliance at all on the resilience of the springs, which may be totally uncompressed. When the pathway race is added, which is done by the ringing in or twisting method familiar to those skilled in the art, the tabs slide past the ramps, totally freeing the rollers and springs, which can then operate without limitation. While the retention scheme here is sound and secure, a special spring must be used, and there is nothing to deal with the roller skew problem or roller spin problem.

SUMMARY OF THE INVENTION

The invention discloses a novel roller clutch design in which individual roller cars that confine and contain each roller cooperate with the cage to indirectly control the rollers from the cage, giving both greatly improved roller operation, as well as greatly improved roller shipping retention. Two embodiments are disclosed. In each embodiment, the roller cars are generally in the form of a box that contains the rollers, but which is open at the top and bottom, so as not to interfere with the roller contacting the race surfaces. Each car confines a roller sufficiently that the roller stays in a substantially fixed orientation relative to the car, and moves the car with it as the roller moves. Since the cage is substantially rigid, and maintains a substantially fixed orientation when installed between the races, a control means cooperating between the cage and the roller cars can be used to control the cars, and thereby indirectly control the rollers, very effectively. Differing degrees of confinement of the roller by the car, and various control means can be used to obtain desired degrees of roller control and improved operation, without interfering with roller travel.

In a first embodiment, the roller clutch is an inner cam type used in an application that is very high speed, and highly subject to roller spin and wear. The outer pathway race is assembled by the ringing in method noted above. Each roller is very tightly confined within its car, so much so that the roller is very securely retained in the car, and any spinning of the roller will be at least partially resisted by the friction generated within the car. The car is, accordingly, molded of a heat resistant material. The roller car control means includes axially overlapping stop members on the car and cage that prevent the car from turning significantly relative to the cage, but which do not interfere with the ability of the cars and rollers to move significantly circumferentially. As a consequence, during overrun, roller travel is not adversely affected, but when pathway traction spins the rollers, the stop members engage and the rollers will be forced to spin inside the cars, generating friction heat and reducing the roller spinning, and cam wear, that would otherwise have resulted. In addition, in the first embodiment, the car control means includes a male latch member on each car that securely pop fits within a resilient female latch member on the cage. The net result of the tight car-roller fit and the car-cage latch is a very sound and secure, rattle free unit, ideal for shipping and handling purposes. The spring is totally divorced from the retention scheme, and need not even be shipped with the unit. When the outer race is rung in and twisted, the consequent shifting of the rollers down the ramps pulls the latch members apart, which then have no effect during subsequent clutch operation. In sum, highly effective roller control is obtained both during shipping and during clutch operation, as well as improved roller operation.

A second embodiment discloses a different roller car control means, which also gives a highly secure shipping retention, but a different type of roller control during clutch operation. In the second embodiment, the roller car holds the roller securely enough to confine the roller in basically a fixed orientation relative to the car, but does not hold the roller tightly. The roller car control means includes a pair of parallel, arcuate rails extending from one side of the car that slidably fit, with clearance, within matching grooves in journal blocks of the cage. Therefore, the car is completely and closely confined relative to the cage, but can still move freely, in the circumferential sense. The net result, again, of the close roller-car confinement, and the car-cage confinement, is that all components are retained together as a very secure unit for shipping, although there is no necessity for a latch to be released at assembly. The strength of the roller retention during shipping, as in the first embodiment, is totally independent of the spring resilience. However, the spring can still be used to maintain the cars and rollers in a defined shipping position, relative to the cage, if desired, but relatively little spring resilience is needed just to maintain shipping position, as opposed to shipping security. During clutch operation, since the rollers are closely confined by the cars, and the cars are confined and guided by the cage, which has a relatively stable orientation relative to the races, the rollers are very effectively prevented from skewing.

It is, therefore, an object of the invention to provide improved roller control, either before clutch installation, during clutch operation, or both, by providing each roller with an individual car that confines the roller and which is controlled from the cage, thereby indirectly controlling the roller from the cage, without limiting the circumferential travel of the roller.

It is another object of the invention to obtain a highly secure shipping retention of the rollers by retaining the rollers securely in the cars, and by providing a car control means that confines the cars relative to the cage without limiting the ability of the cars and rollers to move in the circumferential direction relative to the cage, the net effect of which is a very secure unit for shipping purposes that does not adversely affect clutch operation.

Another object of the invention is to actually improve roller operation, in addition to improving shipping retention, by providing a tightly fitting car and a car control means that prevents the car from turning relative to the cage during overrun without limiting the car's ability to move in the circumferential direction relative to the cage, thereby generating friction between the roller and the car to reduce roller spin and wear.

It is yet another object of the invention to provide a roller car control means that includes a latch that holds the cars securely to the cage prior to installation, but which is released when the pathway race is added.

DESCRIPTION OF THE PREFERRED EMBODIMENTS

These and other objects and features of the invention will appear from the following written description, and from the drawings, in which:

FIGS. 1 through 9 show a first embodiment, and FIG. 1 is a perspective view of a portion of the first embodiment;

FIG. 2 is plan view of part of the first embodiment, showing one roller and spring;

FIG. 3 is an end view of part of the first embodiment of the invention after its installation to the cam race, but before the ringing in of the outer race;

FIG. 4 is a view like FIG. 3, but after the outer race has been assembled, and showing the clutch when there is no relative rotation between the races;

FIG. 5 is a plan view of one car alone;

FIG. 6 is a cross section of one car taken along the line 6—6 of FIG. 5, showing a roller before it is fitted int car;

FIG. 7 is a view like FIG. 6, but showing the roller in place;

FIG. 8 is a cross sectional view of the clutch;

FIG. 9 is a view like FIG. 4, but showing the clutch in operation during overrun.

Figure 1:
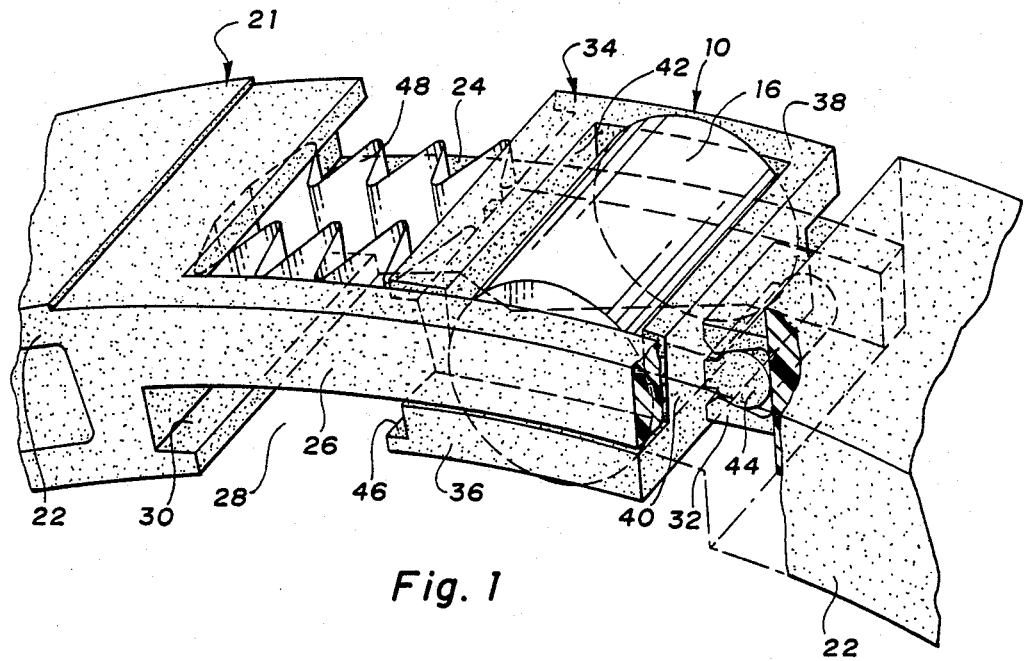
Figure 2:
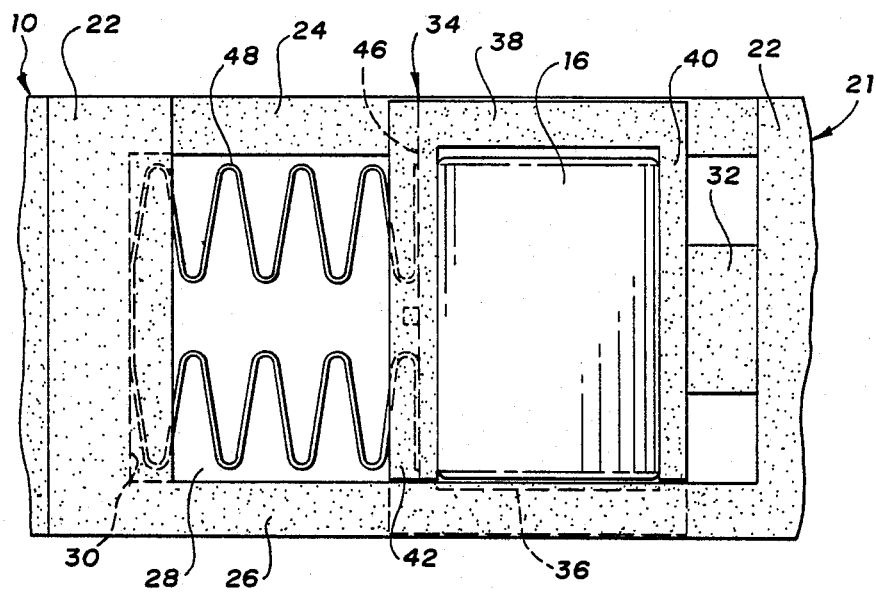

Referring first to FIGS. 1 and 4, a first embodiment of the invention, designated generally at 10, is shown both separate, and after installation between an inner cam race 12 and a coaxial outer race 14. Clutch 10 uses a series of cylindrical rollers 16 in conventional fashion to lock races 12 and 14 together either when inner race 12 tends to rotate counterclockwise relative to outer race 14 or when outer race 14 tends to rotate clockwise relative to inner race 12, while allowing overrun or freewheeling in the converse situations. The lock up mode occurs when rollers 16 jam into the narrow end of wedging pockets formed between a series of cam ramps 18 on cam race 12 and a confronting cylindrical pathway 20 on outer race 14. Clutch 10 is intended for use as a shift timer in an automatic transmission gear set in which overrun occurs when cam race 12 rotates clockwise at very high RPM, while outer race 14 remains stationary. The consequent traction of pathway 20 on rollers 16 could spin them counterclockwise at high speed, causing localized wear troughs on cam ramps 18.

Referring next to FIGS. 1 and 3, clutch 10 includes a cage 21 that provides its basic structural framework, and which consists of a series of journal blocks, designated generally at 22, linked together on one end by arcuate lower side rails 24 and on the other end by arcuate upper side rails 26, thereby creating a plurality of rectangular retention pockets 28. Journal blocks 22 provide concentricity control, keeping the races 12 and 14 substantially coaxial during overrun. Cage 21 is substantially rigid, and fits between the races 12 and 14 with a basically fixed orientation, generally parallel to the race axis. As will be recognized by those skilled in the art, the lower and upper side rails 24 and 26 do not radially overlap, and can therefore be easily molded together with blocks 22 as a unitary molding by a single pair of axially parting mold elements or dies, generally referred to as by pass molding. One side of each block 22 is molded with a slot 30, while the other side is molded with a resilient female latch member 32, which serve a purpose described below.

Referring next to FIGS. 1 and 5 through 7, it will be seen that the rollers 16 do not, as in a conventional clutch, rest by themselves within the retention pockets 28, confined, guided and controlled as they move circumferentially only by the limited sliding, bumping contact of the ends of the rollers 16 with the inside surfaces of side rails 24 and 26. Instead, each roller 16 carries with it a roller control car, designated generally at 34, which, in the embodiment disclosed, cooperates with the side rails 24 and 26, the female latch member 32, and with the rollers 16 to provide roller control both before and after installation. Each car 34 is molded in a general open box shape of a tough, friction and heat resistant material, such as hytrel, capable of dissipating heat. It will be noted that car 34 is molded with the same general over-under configuration as the cage side rails 24 and 26, with upper and lower arcuate side bars 36 and 38 joining cross bars 40 and 42. Thus, car 34 is moldable by the same by pass technique. As best seen in FIG. 1, the width of car 34 is such that its cross bars 40 and 42 can fit closely, but with some axial clearance, between the cage side rails 24 and 26. The interfit of car 34 is axially compact, with its upper side bar 38 extending axially over cage lower side rail 24, and with its lower side bar 36 extending axially under cage upper side rail 26. The arc of the side rails 24 and 26 and of the car side bars 36 and 38 generally matches, so that interfit closely in the radial sense, but also with some radial clearance therebetween. This compact, overlying and underlying relation of cage side rails 24 and 26 and car side bars 36 and 38 is not sufficient, by itself, to retain car 34 securely within the side rails 24 and 26, but does cooperate in the overall soundness of the shipping retention, as well as serving another important function, described below. As best seen in FIG. 6 and 7, the inside surfaces of cross bars 40 and 42 are molded on a radius that is deliberately smaller than the radius of roller 16, so that it will pop fit therewithin very tightly. This not only holds roller 16 to car 24 independently, but creates substantial friction to resist any force tending to spin roller 16 therewithin. Finally, the outside of cross bar 42 is molded with a male latch 44 member that is sized so as to fit tightly and securely, but releasably within female latch member 32, and the outside of cross bar 42 is molded with a slot of similar size to journal block slot 30.

Figure 8:
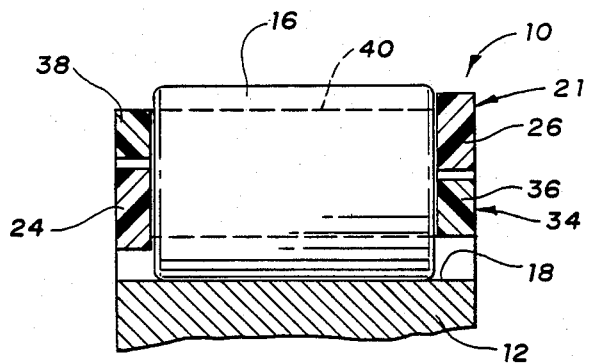

Referring next to FIGS. 1, 3 and 8, to assemble clutch 10, each car 34 is first interfitted between cage side rails 24 and 26, after which its respective roller 16 is popped between cross bars 40 and 42, simultaneously moving between the cage side rails 24 and 26. The rollers 16 could be fitted within the cars 34 first, but this would make it somewhat more difficult to then fit the car 34 between the cage side rails 24 and 26. Then, each male latch member 44 is popped into a female latch member 32. The rollers 16 fit very snugly within the cars 34 independently of the cage side rails 24 and 26, as has already been described. The car 34 and roller 16 are both axially confined between the cage side rails 24 and 26. The latch members 32 and 44 prevent the cars 34 from moving circumferentially relative to the cage side rails 24 and 26, keeping the rollers 16 securely in their shipping position. The latch members 32 and 44 alone provide a significant measure of radial confinement of the cars 34 and rollers 16 relative to the cage side rails 24 and 26. Additional radial confinement of the cars 34 is provided by the overlap of the cage side rails 24 and 26 with the car side bars 36 and 38, best seen in FIG. 8. The net result is a very secure, sound and substantially rattle free unit, with mutual, cooperative confinement of the various components provided axially, circumferentially and radially. The unit can literally be thrown on the floor without dislodging the cars 34 and rollers 16, evidence of a shipping retention that is orders of magnitude stronger than the conventional, spring dependent system. It will be noted that no energizing spring has as yet been described. This is deliberate, as it illustrates that the roller shipping retention, both in terms of roller security and roller position 16, is utterly spring independent in every possible sense. However, as a last assembly step, suitable energizing springs 48 of any desired type or strength may be easily fitted between the facing slots 30 and 46, or not, as desired. If added, then the springs 48 will be as secure as the rollers 16 if the unit is dropped, as they are very light and are well confined in the slots 30 and 46, not disturbed or affected by the rollers 16 in any way in the shipping position. While the vastly improved shipping retention is itself a great improvement, it is achieved with no adverse effect on the operation of clutch 10, as the rollers 16 are entirely conventional, as are the springs 48. In fact, there is an actual improvement in the clutch operation, as will be next described.

Figure 9:
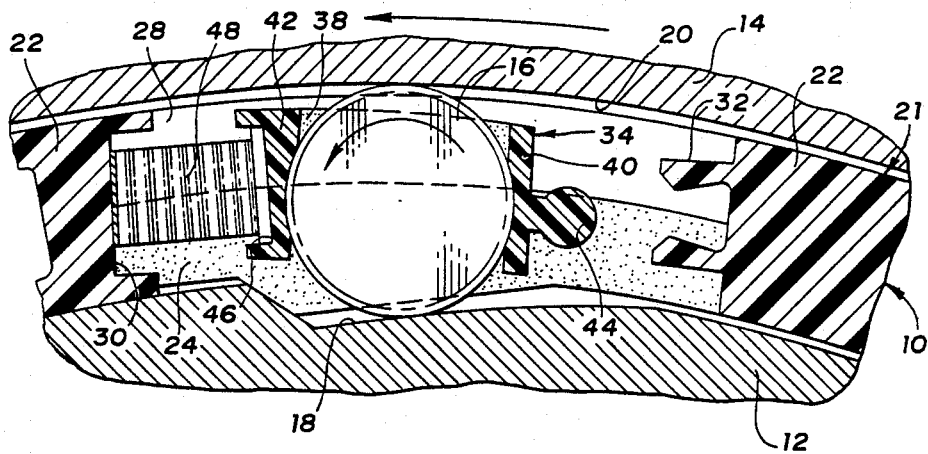

Referring next to FIGS. 3, 4 and 9, clutch 10 is first installed to cam race 12 by pushing it axially on, in conventional fashion, which ties clutch 10 to cam race 12 non turnably. The rollers 16 are each held in the proper shipping position to simultaneously slide onto a respective cam ramp 18, although they will then lie on a circle greater in diameter than the diameter of pathway 20. Next, outer race 14 is added with a conventional pushing and counterclockwise twisting motion. This rolls the rollers 16 counterclockwise down the ramps 18, from the FIG. 3 shipping position to the FIG. 4 operative position. Cars 34 move with the rollers 16, compressing springs 48 and pulling the male latch members 44 out of the female latch members 32. Since the latch is totally disengaged, and since there is the axial and radial clearance between car 34 and the cage side rails 24 and 26 described above, rollers 16 and springs 48 can move circumferentially during clutch operation, without any significant interference between cars 34 and the cage side rails 24 and 26. The rollers 16 can operate, in terms of roller travel just as would a clutch with conventionally retained rollers. However, during clutch overrun, when the rollers 16 begin to spin counterclockwise from pathway traction, the tightly fitting cars 34 will turn with them, but the possible turning is greatly limited, occurring only until the car side bars 36 and 38 hit their respective cage side rails 24 and 26, as seen in FIG. 9. At that point, further spinning of the rollers 16 will rub and generate friction with the tightly fitting cars 34. As a consequence, at least some of the energy transferred by pathway 20 to roller 16 that would otherwise have resulted in faster spin will be dissipated as heat. Reduced spin of rollers 16, of course, will reduce potential roller wear on the cam ramps 18, allowing higher speed operation. In addition, over and above the speed control, the fact that the car cross bars 40 and 42 fit closely between the inside surfaces of the cage side rails 24 and 26 means that, as rollers 16 move circumferentially, they will be kept substantially parallel to cage 21, and thus parallel to the races 12 and 14. The benefit of this roller skew control is had with no additional structure.

Figure 10:
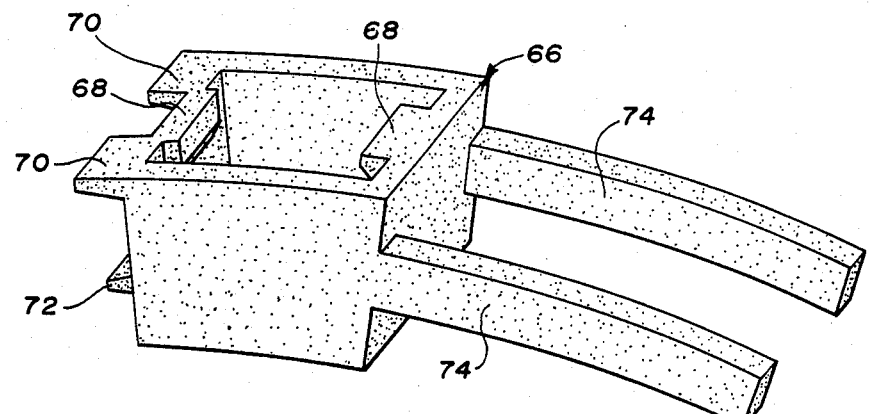
FIG. 10 is a perspective view of the roller car of a second embodiment.
Figure 11:
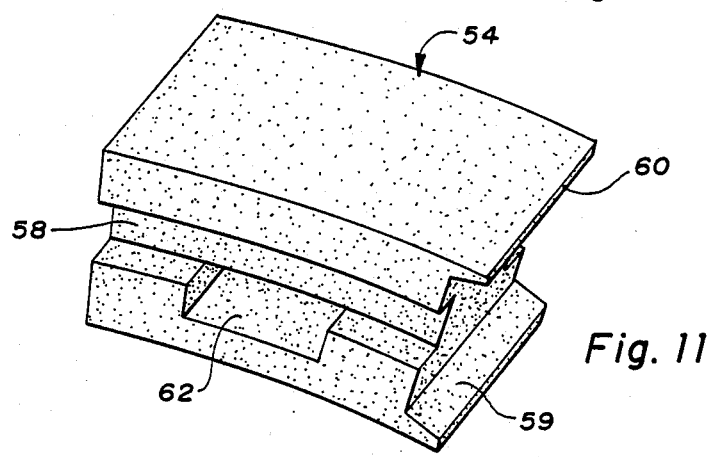
FIG. 11 is a perspective view of the journal block of the second embodiment.
Figure 14:
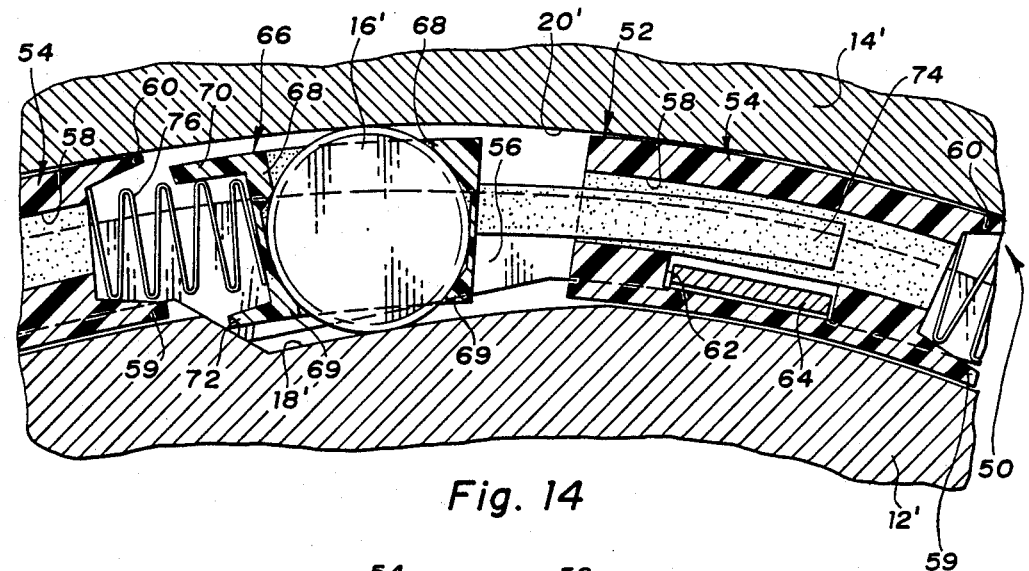
FIG. 14 is a view like FIG. 13, but after assembly of the outer race.
Figure 15:
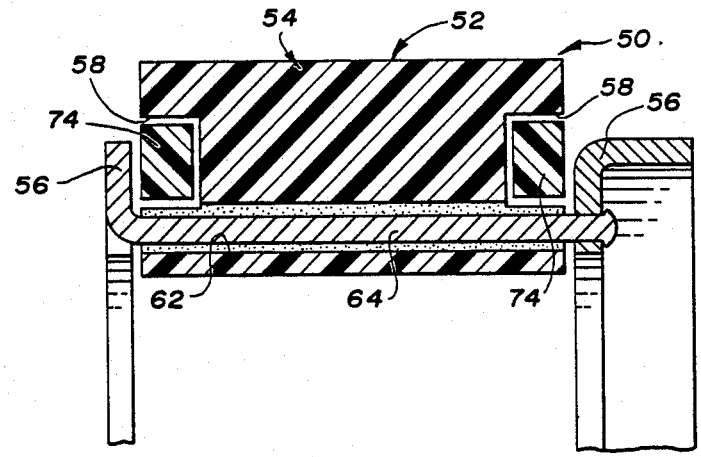
FIG. 15 is a radial cross sectional view of the second embodiment.

Referring next to FIGS. 10, 14 and 15, a second embodiment of the invention, designated generally at 50, uses identical rollers, 16', and fits between two identical races, also given the same number as in the first embodiment 10, with a prime. Clutch 50 provides a similar degree of roller retention security, and a very high degree of roller skew control, but is not intended to provide roller spin control, and is, therefore, better suited to environments where spin control is not as necessary. Also, the shipping retention of the second embodiment 50 does not have to be released at clutch installation. The cage 52, while substantially rigid, is not the unitary molded type, but is instead built up of a spaced series of journal blocks, designated generally at 54, which are held between an axially spaced pair of metal end rings 56. Each journal block 54, which is molded of suitable plastic material, includes a pair of parallel grooves 58, which are arcuate, and lie on the same radius, concentric with the axis of races 12' and 14'. Each journal block 54 is also molded with a pair of spaced flanges 60 on one end, and a through slot 62, and those skilled in the molding art will recognize that block 54 has a configuration that will allow it to be by pass molded. Cross bars bent off of one of the end rings 56 are run through the journal block through slots 62 and crimped over to provide the basic framework of cage 52. As is conventional, cage 52 is installed between the races 12' and 14' and is non turnably tied to cam race 12'. The journal blocks 54 keep the races 12' and 14' basically coaxial, and the cage 52 maintains basically a fixed orientation between the races 12' and 14'.

Figure 12:
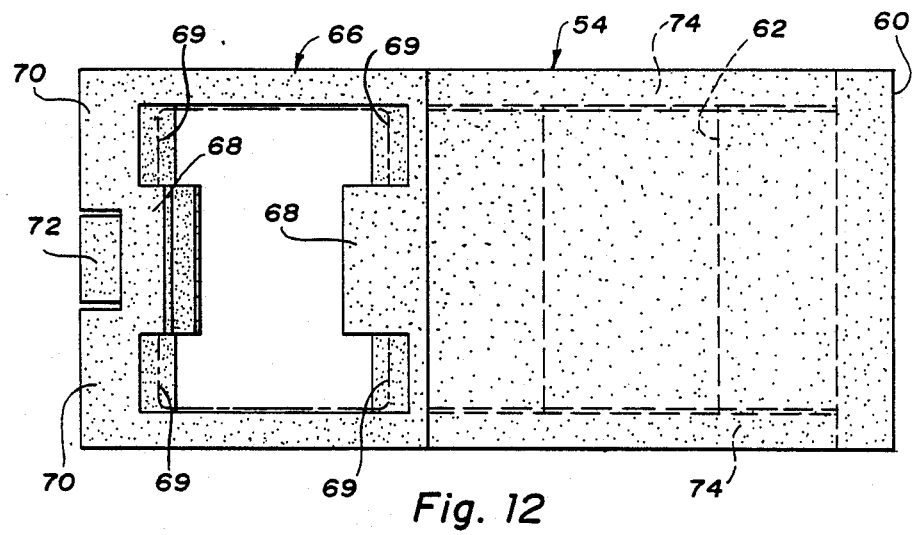
FIG. 12 is a plan view of a roller car and journal block of the second embodiment.

Referring next to FIGS. 10, 12 and 15, each roller car 66 of the second embodiment 50 is molded of plastic and has the same basic box shape as in the first embodiment 10. However, the roller 16' is differently contained and confined therewithin. Car 66 is molded with upper ribs 68 on the inside top and lower ribs 69 on the inside bottom, between which roller 16' may be securely pop fitted. While roller 16' will not be tightly, frictionally held, it will be closely enough confined that the car 66 will stay with it with a generally fixed relative orientation, that is, car 66 will stay square to roller 16', in effect. Also, enough of the roller 16' is contained that will not come out even if car 66 is shaken very vigorously. Car 66 is also molded with a pair of spaced flanges 70 and 72 on one end, and a pair of parallel arcuate rails 74 standing out from the other end. Rails 74 basically match the journal block grooves 58, and slidably fit therewithin closely, but with some clearance, best seen in FIG. 15. Therefore, rails 72 can slide circumferentially freely within grooves 58 but they, and hence car 66, will be radially and axially confined relative to journal block 54. As noted, roller 16' stays essentially square to car 66, and since car 66 stays square to journal block 54, so does roller 16'. When blocks 54 are mounted between end rings 56, as described above, the retention of the roller cars 66 to cage 52 is complete. Each roller car 66 can move circumferentially freely, but only until it hits the leftward adjacent journal block 54. Hence, the rails 74 are prevented from exiting the slots 62, and the roller cars 66 are retained to the cage 52 very securely, although slidably. Since the rollers 16', which may be added at any point, are retained to the cars 66 very securely, the net effect is that the rollers 16' are very securely retained to the clutch 50.

Figure 13:
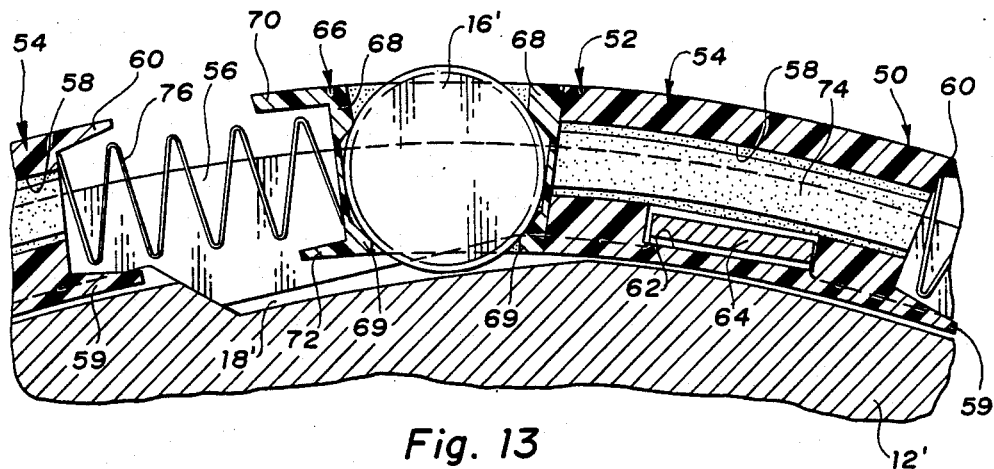
FIG. 13 is a cross sectional view of a portion of the second embodiment prior to assembly of the outer race.

Referring next to FIGS. 13 and 14, to complete clutch 50, conventional energizing springs 76 may be fitted between the journal block flanges 59 and 60 and the roller car flanges 70 and 72. Again, the springs 76 have nothing to do with the strength or security of roller shipping retention, but may, as seen in FIG. 13, be used to press the car 66 against the rightward adjacent journal block 54, thereby maintaining the rollers 16' in the definite shipping position shown. This is a great convenience to installing clutch 50 to cam race 14', because the rollers 16' are held in the proper position to slide onto cam ramps 18', but it is not necessary. As seen in FIG. 14, when the outer race 12' is added by ringing it in, the rollers 16' are shifted to the left, and the rails 74 slide freely within the journal block grooves 62 as the springs 76 compress. During clutch operation, roller 16' may travel right and left up and down cam ramp 18' freely, but, since roller 16' is held square to car 66, and since the rails 74 are so closely axially confined by the grooves 62, the net effect is that roller 16' will receive a very high degree of skew control. Roller 16' will be kept parallel to the axis of cage 52, and thus, to the axis of the races 12' and 14'. Though this control of the rollers 16' by the cage 52 is indirect, through the medium of the cage controlled roller holding cars 66, it is highly effective. Furthermore, roller 16' is prevented from moving too far to the left, generally referred to as roller pop out, by the engagement of roller car lower flange 72 with the surface of cam race 14'. Thus, while roller 16' is allowed to move in the circumferential direction as much as it needs to, it is not allowed to move farther than it should, or to move out of its ideal orientation.

Given the basic idea of confining a roller with a roller car, and then controlling the car with the cage to indirectly, but effectively control the roller with the cage, many variations of the disclosed embodiments could be made. The roller cars could be used just as roller retention members alone if it were only shipping retention that was desired. That is, the roller car control means would be used to control the roller only prior to installation. In such a case, the roller car control means could consist of just the releasable latch, for example, and the car would not have to overlap with the cage or be guided by the cage at all during clutch operation. The roller cars could be used to control the rollers only after clutch installation, with no contribution to roller shipping retention. That is, if the cars surrounded the rollers closely enough to stay square to the rollers as the rollers traveled, but did not wrap enough of the rollers to independently hold them, then the cars could still be guided by the cage to keep the rollers from skewing, but the rollers would not receive any shipping retention. Many variations of the releasable latch of the first embodiment, as well as variations of the slot and rail attachment between the roller cars and journal blocks of the second embodiment, may be made. Limit means other than the cage-car overlap disclosed could be used to prevent the car from turning relative to the cage, when spin control is desired. For example, an energizing spring with high enough resistance to twisting, and which fitted closely in the car slot and the journal block slot, could limit turning of the car, or some part of the car could engage the cam race during overrun to limit turning. Therefore, it will be understood that it is not intended to limit the invention to just the embodiment disclosed.

The embodiments of the invention in which an exclusive property or privilege is claimed are defined as follows:

1. A roller clutch of the type in which a plurality of cylindrical rollers is located between a pair of substantially coaxial clutch races and in which the upper and lower surface of each of said rollers is selectively engageable between a cylindrical pathway on one race and a respective confronting sloped cam ramp formed on the other race, and in which said rollers must move significantly in the circumferential direction between said races during clutch operation, said roller clutch comprising, a cage adapted to be installed between said races so as to maintain a substantially fixed orientation relative to the axis of said races, a plurality of roller cars, one for each said roller, which leaves the upper and lower surfaces of said roller exposed to said races while enclosing and confining a sufficient portion of said roller such that said roller is maintained in a substantially fixed orientation relative to said car so that said roller carries said car with it as it moves circumferentially between said races during clutch operation, and, roller car control means operable between said cage and said roller cars to confine said cars relative to said cage, and thereby indirectly control said rollers with said cage, said control means allowing said cars to move substantially freely in the circumferential direction relative to said cage during clutch operation so that said rollers can also move substantially freely between said races during clutch operation.

2. A roller clutch of the type in which a plurality of cylindrical rollers is located between a pair of substantially coaxial clutch races and in which the upper and lower surface of each of said rollers is selectively engageable between a cylindrical pathway on one race and a respective confronting sloped cam ramp formed on the other race, and in which said rollers must move significantly in the circumferential direction between said races during clutch operation, said roller clutch comprising, a substantially rigid cage adapted to be installed between said races so as to maintain a substantially fixed orientation relative to the axis of said races, a plurality of roller cars, one for each of said rollers, which leaves the upper and lower surfaces of said roller exposed to said races while enclosing and confining a sufficient portion of said roller to retain it securely within said car in a substantially fixed orientation relative to said car so that said roller carries said car with it as it moves circumferentially between said races during clutch operation, and, roller control means operable between said cage and said roller cars to confine said cars relative to said cage, thereby indirectly retaining said rollers to said cage as a secure unit, said control means also allowing said cars to move substantially freely in the circumferential direction relative to said cage during clutch operation, so that said rollers can also move substantially freely between said races during clutch operation.

3. A roller clutch of the type in which a plurality of cylindrical rollers is located between first and second substantially coaxial clutch races and in which the upper and lower surface of each of said rollers is selectively engageable between a cylindrical pathway on said second race and a respective confronting sloped cam ramp formed on said first race, and in which said rollers must move significantly in the circumferential direction between said races during clutch operation, and in which said second race is assembled a twisting action that shifts each of said rollers along its respective cam ramp in the direction of twisting, said roller clutch comprising, a substantially rigid cage adapted to be installed to said first race before said second race is installed added so as to maintain a substantially fixed orientation relative to the axis of said races, a plurality of roller cars, one for each of said rollers, which leaves the upper and lower surfaces of said roller exposed to said races while enclosing and confining a sufficient portion of said roller to retain it securely within said car in a substantially fixed orientation relative to said car so that said roller carries said car with it as it moves circumferentially between said races during clutch operation, and, roller control means including latch members on said cage and roller cars that securely retain said roller cars to said cage prior to the assembly of said second race, thereby indirectly retaining said rollers to said cage as a secure unit prior to clutch installation, said latch members being released when said second race is added and said rollers are shifted, thereby freeing said cars from said cage so that said cars and said rollers can move substantially freely in the circumferential direction between said races during clutch operation.

4. A roller clutch of the type in which a plurality of cylindrical rollers is located between inner and outer substantially coaxial clutch races and in which the upper and lower surface of each of said rollers is selectively engageable between a cylindrical pathway on the outer race and a respective confronting sloped cam ramp formed on the inner race, and in which said rollers must move significantly in the circumferential direction between said races during clutch operation and are subject to pathway traction during clutch overrun that tends to spin said rollers and wear said cam ramps, said roller clutch comprising, a cage adapted to be installed between said races so as to maintain a substantially fixed orientation relative to the axis of said races, a plurality of roller cars, one for each said roller, which leaves the upper and lower surfaces of said roller exposed to said races while enclosing and confining said roller sufficiently tightly that said roller carries said ca with it as it moves circumferentially between said races during clutch operation, with any spinning of said roller within said roller car being at least partially resisted by roller-car friction, and, roller car control means operable between said cage and said roller cars to confine said cars relative to said cage to prevent said car from turning relative to said cage during clutch overrun while still allowing said cars and rollers to move substantially freely in the circumferential direction relative to said cage during clutch operation, whereby, during clutch overrun, the spinning of said roller caused by said pathway traction will be reduced by the friction generated between said car and roller, thereby reducing potential cam wear.

* * * * *